United States Patent [19]

Birkenstock et al.

[11] 4,224,248

[45] Sep. 23, 1980

[54] PROCESS FOR THE DEPYROPHORIZATION OF PYROPHORIC METAL CATALYSTS AND USES THEREOF

[75] Inventors: Udo Birkenstock, Ratingen; Josef Haydn, Leverkusen, both of Fed. Rep. of Germany

[73] Assignee: Bayer Aktiengesellschaft, Leverkusen, Fed. Rep. of Germany

[21] Appl. No.: 953,227

[22] Filed: Oct. 17, 1978

Related U.S. Application Data

[62] Division of Ser. No. 806,238, Jun. 13, 1977, Pat. No. 4,176,092.

[30] Foreign Application Priority Data

Mar. 25, 1977 [DE] Fed. Rep. of Germany ....... 2713373

[51] Int. Cl.$^2$ .................. C07C 85/11; C07C 85/12
[52] U.S. Cl. ......................... 260/580; 252/461; 252/463; 252/467; 252/471; 252/472; 252/476; 252/477 Q; 260/576; 260/577; 260/578; 260/583 K; 260/583 L; 568/772; 568/861; 568/862; 568/864; 568/865; 585/270; 585/276

[58] Field of Search ............... 252/466 J, 472, 477 Q, 252/461, 463, 467, 471, 476; 260/578, 580

[56] References Cited

U.S. PATENT DOCUMENTS

| | | | |
|---|---|---|---|
| 3,425,959 | 2/1969 | Haddad | 252/477 Q |
| 3,544,485 | 12/1970 | Taira et al. | 252/477 Q |

*Primary Examiner*—John Doll
*Attorney, Agent, or Firm*—Sprung, Felfe, Horn, Lynch & Kramer

[57] ABSTRACT

A process has been developed for the depyrophorization of pyrophoric metal catalysts, such as Raney nickel catalysts, which comprises treating said pyrophoric metal catalysts in water and/or an organic solvent with an organic nitro compound or a nitroso compound. The catalysts which are obtained according to the process of the invention are useful for carrying out all hydrogenation reaction which can be carried out using the corresponding pyrophoric catalysts. The catalysts obtained are further distinguished by high activity and extended life. They are not contaminated by contact catalyst poisons and can be used essentially without pre-activation.

6 Claims, No Drawings

PROCESS FOR THE DEPYROPHORIZATION OF PYROPHORIC METAL CATALYSTS AND USES THEREOF

This is a division, of application Ser. No. 806,238, filed June 13, 1977, now U.S. Pat. No. 4,176,092.

The present invention relates to a process for the depyrophorisation of pyrophoric metal catalysts by reacting them with organic nitro or nitroso compounds.

Pyrophoric metal catalysts are to be understood as compositions which contain one or more metals in a very finely divided form and are used for catalytic purposes. Catalysts of this type are in use under the most diverse names, for example catalysts of the black type, such as platinum black and palladium black; also supported catalysts which contain metals, in particular noble metals, in a very finely divided form on a support, such as active charcoal, silicon dioxide, kieselguhr and aluminium oxide, for example platinum-on-active charcoal, palladium-on-active charcoal and nickel-on-kieselguhr, as well as catalysts of the Raney type.

The so-called Raney catalysts have acquired very particular importance as pyrophoric metal catalysts. Raney catalysts are obtained by dissolving out from an alloy of a catalytically active metal, in most cases nickel, with a catalytically inactive metal, for example aluminium, the aluminium being dissolved out using an alkali metal hydroxide solution under the influence of heat (U.S. Pat. No. 1,563,587). A metal sludge is obtained by this procedure, which possesses a severely fissured and porous structure and has a skeleton of metal crystals, for which reason these catalysts are also designated skeleton catalysts. The most frequently encountered representative of this type is Raney nickel, which is named after its inventor. Raney nickel consists essentially of aluminium, aluminium oxide constituents and hydrogen, in addition to the main component, nickel. The charging of the Raney catalysts with hydrogen in the course of their preparation is the basis of their use as hydrogenation catalysts and is responsible for their pyrophoric properties.

The pyrophoric character of these catalysts necessitates a number of instructions, which involve considerable expenditure, for their handling and storage and, in particular, also for their transportation. For example, it must be ensured that pyrophoric catalysts are never exposed to atmospheric oxygen, that is to say that the catalyst never dries out and is always covered with a layer of liquid, generally water. This condition can lead to considerable difficulties in the hydrogenation of compounds which can be reacted only in anhydrous solvents, since the catalyst must be washed free from water before its use. When the water is replaced by combustible organic solvents, for example benzene, working with these catalysts becomes particularly critical. The pyrophoric character of the metals must be taken into account also when carrying out the hydrogenation reactions. For example, the hydrogenation apparatus has to be carefully rinsed with an inert gas before being filled with the contact catalyst, in order to prevent the contact catalyst from igniting the organic solvent on the entry of air.

In the publication by J. Tröger and G. Vollheim, Chemiker-Zeitung 99 (1975), page 446 to 452, it is thus stated (page 451, right-hand column, line 1 to 6):

"Thus repeated attempts have been made to prepare a Raney nickel which is non-pyrophoric and yet has the same high activity as the pyrophoric type. Although many routes have been followed, no catalyst has hitherto been found with which this aim would have been achieved."

Of the many attempts which have been made to reduce or remove the adverse properties of the pyrophoric metal catalysts, the following measures, for example, for the treatment of pyrophoric metal catalysts have been proposed: treatment with carbon dioxide/oxygen mixtures (U.S. Pat. No. 2,677,668); with $H_2O$/vapour at 150° C. (Chem. Techn. 15, 583 et seq. (1963)); with oxygen (Ind. Chim. belge 17, 581 (1952)) and with $CO_2$ at 200° C. (J. Sci. Res. Inst. (Tokio) 51, 168 (1957), and Japanese Patent 4325); with gelatine in the presence of $Na_2SO_4$ solution, $H_2CO$ and other admixtures (Canadian Pat. No. 869,533); with $Na_2Cr_2O_7$ (U.S. Pat. No. 3,563,915 and with NaOCl or $H_2O_2$ or $KMnO_4$ or $K_2Cr_2O_7$ (DAS (German Published Specification) No. 1,299,286); with $CO_2$ at 200° to 650° C. (U.S. Pat. No. 2,461,396); and with $HNO_3$ or $NH_4NO_2$ or $NaNO_3$ or $NaNO_2$ (DAS (German Published Specification) No. 2,209,000) and with $NaNO_2$ (U.S. Pat. No. 2,810,666).

However, all these processes and the catalysts which are obtainable thereby have considerable disadvantages. In particular, the catalysts are brought into contact with foreign substances in the course of these processes, which can have the effect of catalyst poisons when the catalysts are charged with these foreign substances or even when only traces of these foreign substances enter into the catalysts treated in this manner. A further disadvantage of the proposed processes for the treatment of pyrophoric metal catalysts is that the catalysts thus obtained must be reactivated before their employment, so that a pre-treatment becomes necessary before the employment.

On the other hand, the modern chemical industry requires increasingly larger amounts of active catalysts which, with respect to their activity, should behave as pyrophoric contact catalysts, but, with regard to the continuously increasing requirements of transportation and use safety, should behave as non-pyrophoric catalysts in order to reduce or completely eliminate the danger of fire and explosion.

It has now been found that non-pyrophoric, highly active metal catalysts can be prepared from pyrophoric metal catalysts when a suspension of the pyrophoric metal catalyst in water and/or an organic solvent is treated with an organic nitro compound or a nitroso compound.

In general, the treatment with the nitro compound or the nitroso compound is carried out at temperatures of about 5° to about 250° C., preferably at 20° to 200° C. and particularly preferably at 40° to 150° C. This treatment can be carried out under normal pressure, under increased pressure or also under reduced pressure. Pressures of 1 to 30 bars are preferaly used. The treatment is particularly preferably carried out at pressures of 2 to 10 bars. In general, the ratio of nitro compound or nitroso compound to metal catalyst is 0.05 to 100 mols of nitro or nitroso group per 1 g atom of metal in the catalyst. The ratio of mols of nitro compound or nitroso compound to g atoms of metal catalyst is preferably 0.25 to 20:1, and particularly preferably 0.5 to 5:1. Very preferentially, this ratio is about 1:1. The time of the action of the nitro compound, which is added in the form of an aqueous, aqueous-alkaline or a non-aqueous solution to the aqueous or organic suspension of the metal catalyst, can be varied within wide limits and is 5 minutes to 10 hours, preferably 10 minutes to 5 hours. It can also be appropriate to use the nitro compound in the undiluted form, that is to say not dissolved in an organic solvent.

If the pyrophoric metal catalyst is employed as a suspension in an organic solvent alone or mixed with water or an aqueous-alkaline medium, the most diverse organic solvents which are inert towards the nitro or nitroso groups in the corresponding compounds can be used. It can sometimes be appropriate for the solvent used to form a homogeneous phase with the nitro or nitroso compound or the solution of the nitro or nitroso compounds, but this is in no way necessary for carrying out the process according to the invention. Solvents which can be used for the suspension of the pyrophoric metal catalyst to be employed are, for example: aliphatic, cycloaliphatic or aromatic as well as heterocyclic compounds, which can also be substituted. Suitable aliphatic hydrocarbons are straight-chain or branched hydrocarbons with 1-12, preferably with 5-8, hydrocarbon atoms. Cyclic hydrocarbons which can be used are those with 5-7, preferably with 6, carbon atoms in the ring system. Heterocyclic compounds which can be used are those with 5-7, preferably 6, atoms in the ring system. Suitable heterocyclic compounds are preferably 5-membered and 6-membered system which can contain oxygen and/or nitrogen as the hetero-atom.

The compounds employed as solvents can contain substituents, such as halogen atoms, for example fluorine, chlorine and bromine; hydroxyl, amino, sulphonic acid and carboxyl groups, as well as their esters; and $C_1$–$C_4$-alkoxy groups and $C_1$–$C_{12}$-alkyl radicals. Particularly preferred organic solvents which can be used are hydrocarbons, such as hexane, cyclohexane, benzene, toluene and xylene; alcohols, such as methanol, ethanol, propanol, isopropanol, butanol, amyl alcohol, ethylene glycol, glycerol and cyclohexanol; ethers, such as ethylene glycol monoethers and ethylene glycol diethers, ethylene glycol monotolyl ether and triethylglycol methyl ether; ketones, such as acetone; amines, such as ethylamine, cyclohexylamine and ethylenediamine; and phenols, such as phenol, 3-acetoxyphenol, resorcinol and pyrocatechol, as well as mixtures and blends of these compounds in the most diverse compositions.

Furthermore, solvents which can be used for the process according to the invention are aromatic and aliphatic hydrocarbons which contain small additions of water and additions of the compounds listed above, especially of alcohols. Thus, the following mixtures of alcohols with water have proved particularly suitable: isopropanol/water, methanol/water, ethanol/water, glycerol/water and ethylene glyol/water. The water contents can be chosen as desired and are, in general, 5–95, preferably 10–50%. Finally, solvents which can be used for the process according to the invention are water and aqueous solutions or suspensions of alkalis, such as, for example, the oxides, hydroxides, carbonates and bicarbonates of the alkali metals and alkaline earth metals, it being possible for the concentrations of these solutions to be chosen as desired. In general, they are 0.5–70, preferably 5–50 and very preferentially 10–40, % by weight.

Suitable organic nitro compounds or nitroso compounds with which the pyrophoric metal catalyst can be treated by the process according to the invention are the most diverse types of compounds. Both saturated, straight-chain or branched aliphatic, cycloaliphatic or aromatic systems and heterocyclic systems can be used which contain at least one nitro or nitroso group, it being possible for the compounds mentioned also to be substituted. Suitable aliphatic nitro or nitroso compounds are the appropriate straight-chain or branched compounds with 1 to 12, preferably 1 to 8, carbon atoms. Cycloaliphatic nitro or nitroso compounds which can be used are those with 5 to 7 carbon atoms, preferably those with 6 C atoms, in the ring system. In general, aromatic nitro and nitroso compounds which can be employed in the process according to the invention contain up to 14 carbon atoms, preferably 6 to 10 carbon atoms, in the aromatic nucleus. Suitable heterocyclic nitro or nitroso compounds are preferably 5-membered and 6-membered heterocyclic compounds which can contain oxygen and/or nitrogen as heteroatoms. The heterocyclic compounds can also be fused once or twice with an optionally completely or partially hydrogenated aromatic ring. The nitro or nitroso compounds to be employed can contain 1 to 3 nitro groups or 1 to 3 nitroso groups in the molecule. Possible further substituents of the nitro and nitroso compounds mentioned are halogen atoms, such as fluorine, chlorine and bromine; hydroxylamino, sulphonic acid and carboxyl groups as well as their esters; and $C_1$–$C_4$-alkoxy groups, carbonyl groups and $C_1$–$C_{12}$-alkyl radicals. In general, nitroso compounds which can be used are all compounds of very different structure containing a nitroso group, for example also nitrosomethylurea. From the relevant technical literature it is known, with respect to the nitroso compounds, that they do not occur in large numbers as is the case with the corresponding nitro compounds since, in general, the nitroso compounds are classed as unstable substances.

In detail, the following nitro compounds are preferably suitable for use in the process according to the invention: nitrobenzenes and halogenonitrobenzenes, such as nitrobenzene, monochloronitrobenzenes, dichloronitrobenzenes, trichloronitrobenzenes, dinitrobenzenes and mono-, di and tri-chlorodinitrobenzenes, nitrotoluenes and halogenonitrotoluenes, such as nitrotoluene, mono-, di- and tri-chloronitrotoluenes, nitrobenzyl chlorides, 4-chloro-3-nitro-benzotrifluoride, dinitrotoluene, dinitrotoluene/toluylenediamine mixtures, nitroxylenes, 4-nitrobiphenyl, nitronaphthalenes, such as mono- and di-nitronaphthalene, mono- and di-nitronaphthalenesulphonic acids and their salts, nitrophenols, mono-, di- and tri-nitrophenols, mono- and di-nitroanisoles, nitrodiphenyl ethers, mono- and di-nitrophenetols, mono-, di- and tri-nitrochlorophenols, nitrochloroanisoles, chloronitrodiphenyl ethers, nitrosophenols, nitro derivatives of thiophenols, such as nitrodiphenyl sulphones and dinitrodiphenyl sulphides, nitrocresols, such as mono- and di-nitrocresols, nitroalkylanisoles, nitrobenzaldehydes, such as nitrobenzaldehyde and chloronitrobenzaldehydes, nitroacetophenones, nitrobenzoic acid derivatives, such as nitrobenzoic acid, nitrobenzoic acid esters, mono- and di-nitrochlorobenzoic acid and esters thereof, nitrotoluic acid and esters thereof and nitrohydroxybenzoic acid and esters thereof, nitrophenylsulphonic acids and their salts, such as nitrophenolsulphonic acids and the Na salt, and chloronitrophenolsulphonic acid and the Na salt, nitrophenylamines, such as mono- and di-nitroanilines, and N-alkyl-nitroanilines, nitrodiphenylamines, nitrochloroanilines, nitroalkanes, such as nitromethane and nitroethane, and 2-nitro-5-phenyl-thiomethoxyacetanilide.

In detail, nitroso compounds which can be used are: tert.-nitrosolentane, nitrosocyclohexane, nitrosodiethylaniline. nitrosodimethylamine, p-nitrosodimethylaniline, nitrosocresols, nitrosonaphthols, nitrosonaphthylamine, nitrosonitrotoluenes, nitrosophenols, nitrosopropionic acid, nitrosoresorcinol, nitrososalicylic acid and esters of nitrosalicylic acid, nitrosothymol, nitrosotoluidine, N-nitrosodiphenylamine, hydroxynitrosonaphthalenesulphonic acid, nitrobenzene, N-nitrosomethylurethane and N-nitrosomethylurea.

The organic nitro compounds or nitroso compounds can be treated in the most diverse forms with the pyrophoric metal catalysts. They can be employed either free from solvents and in the liquid or solid form or as solutions of any desired concentration in aqueous or non-aqueous solvents. Solvents which can be used are preferably all systems which are inert towards the nitro or nitroso groups in the corresponding compounds under the particular conditions of the process according to the invention. In general, the solvents used form a homogeneous phase with the nitro or nitroso compound. However, it is in no way necessary for the treatment according to the invention that the nitro or the nitroso compound homogeneously dissolves in the solvent. When water is used, for example, as a rule a two-phase system is formed with the nitro compound, which, however, is also suitable for the process according to the invention. Such two-phase systems can optionally also be used in the form of an emulsion, for example if a suitable emulsifier is added.

Solvents which can be used for the organic nitro or nitroso compounds are those solvents which have already been mentioned for the suspension of the pyrophoric metal catalyst to be employed in the process according to the invention.

The organic nitro or nitroso compounds can be metered into the initially introduced suspension of the pyrophoric metal catalyst, or vice versa. Preferably, the solution of the organic nitro or nitroso compound is metered into the suspension of the pyrophoric metal catalyst, this preferably being suspended in the same solvent which has served as a solvent for the organic nitro or nitroso compound.

Metal catalysts, the pyrophoric character of which arises from the surface or also from physically or chemically bonded hydrogen, such as are described, for example, in Chemiker-Zeitung, 99, (1975), page 447 to 448, can be used as pyrophoric metal catalysts, for the process according to the invention, which consist of one or more components and which can also contain one or more active metals.

For example, pyrophoric catalysts which contain metals of the groups IIa, IIIb, IVa, IVb, Vb, VIb, VIIb, VIII and Ib of th periodic system according to Mendeleev (a=main group elements, b=sub-group elements) and the rare earths can be employed in the process according to the invention. In detail, there may be mentioned, for example: thallium, vanadium, chromium, manganese, iron, cobalt, titanium, nickel, copper, zirconium, niobium, molybdenum, ruthenium, rhodium, palladium, silver, hafnium, tantalum, tungsten, rhenium, osmium, iridium, platinum, gold and lead. Preferably Raney catalysts are employed in the process according to the invention. Nickel-containing or nickel- and iron-containing catalysts are very particularly employed.

The reaction can be carried out up to a maximum temperature of 250° C., preferably in the range from 20° to 200° C. It is appropriate to carry out the reaction with the addition of an inert gas under a slight excess pressure. If the pyrophoric metal catalyst is stored under water for reasons of safety, it can be advantageous to remove as much water as possible or, if the nitro or nitroso compound is employed as a solution, to replace the water by the solvent employed. The duration of the treatment with the nitro or nitroso compound by the process according to the invention is about 5 minutes to about 10 hours, preferably 10 minutes to 5 hours and particularly preferably 15 minutes to 2 hours. After the treatment with the nitro or nitroso compound, the catalyst, which is now depyrophorised, is separated off for working-up, which in general is effected by a filtration process which is accessible in industry. The catalyst is then washed and, if appropriate, dried.

The feasibility of carrying out the process industrially is illustrated with the aid of the depyrophorisation of Raney nickel.

After replacing the associated water by a suitable solvent, for example isopropanol, pyrophoric Raney nickel is initially introduced and treated with a solution of an organic nitro compound, for example dinitrotoluene in isopropanol, in the ratio of mols of $NO_2$ to g atoms of Ni of 0.1 to 20:1 at 30° to 70° C. After a reaction time of several hours, for example 4 hours, the catalyst is filtered off, washed, if necessary, with an organic solvent, for example isopropanol; and dried. The solutions obtained by this procedure can be either worked up by processes which are in themselves known or, after replacing the nitro compound consumed, by fresh nitro compound, re-employed in the process according to the invention.

The essential advantage of the process according to the invention compared with the process known hitherto for the preparation of completely or partially non-pyrophoric catalysts is that the depyrophorised catalysts thus obtained are not contaminated by contact catalyst poisons and start to function, without any pre-activation, at comparable, or only insignificantly elevated, temperatures to the pyrophoric catalysts on which they are based, that is to say that the catalytic activity of the catalysts depyrophorised by the process according to the invention is comparable to that of pyrophoric catalysts. When used repeatedly, the catalysts depyrophorised by the process according to the invention exhibit a very long life whilst the activity remains constant.

The process according to the invention can be carried out industrially in the sump phase, in the trickle phase or in the gas phase. The treatment of the Raney catalysts with nitro or nitroso compounds can be carried out discontinuously or continuously, for example in a cascade.

The main advantage of the non-pyrophoric catalysts prepared according to the invention is their completely problemfree handling, which makes possible transportation and storage without special restrictions and makes a more precise metering possible, compared with pyrophoric catalysts.

The despatch of the catalysts depyrophorised by the process according to the invention can be carried out in the dry form free from the transportation restrictions for dangerous goods, it being possible for the catalysts to be packed, stored and despatched in any desired packagings. Ballast substances, such as water, in which pyrophoric catalysts are as a rule suspended for despatch and storage, are dispensed with. Also, the danger of the ignition of organic solvents or other combustible substances on entry of air is eliminated in the case of the non-pyrophoric catalysts prepared according to the invention.

When pyrophoric Raney catalysts are employed in anhydrous media, the replacement of water by the required medium, for example benzene, is carried out before the actual catalytic reaction. When non-pyrophoric Raney catalysts, obtainable by the process according to the invention, are employed this not unhazardous process step is also avoided.

The present invention furthermore relates to the use of the non-pyrophoric metal catalysts for the most diverse hydrogenation processes. For example, all hydrogenation reactions, which are otherwise carried out with the corresponding pyrophoric catalysts, can be carried out with the nonpyrophoric metal catalysts prepared according to the invention, for example the Raney catalysts. In order to indicate, for example, the extent of the use possibilities of the non-pyrophoic Raney catalysts, the monograph by B. M. Bogoslowski and S. S. Kaskowa "Skelettkatalysatoren in der organischem Chemie" ("Skeleton Catalysts in organic Chemistry"), VEB Deutscher Verlag der Wissenschaften, Berlin 1960, chapter 3, "Verwendung von Nickel-Skelettkatalysatoren in der organischen Chemie" (Use of nickel skeleton catalysts in organic chemistry), page 40-124 is referred to. The catalysts according to the invention can be used for all the hydrogenation processes listed there.

Accordingly, for example, the metal catalysts prepared according to the invention can be employed for the hydrogenation of unsaturated hydrocarbons with an ethylenic and/or triple bond, or of diene systems, of aromatic compounds, such as, for example, benzene, naphthalene, diphenyl and their derivatives, or of anthraquinone and phenanthrene, of heterocyclic compounds with oxygen or sulphur atoms in the ring system, of carbonyl groups, of carboxyl groups or their esters, of carbon-nitrogen comounds, such as, for example, nitriles, acid amides, oximes and ketimines, of unsaturated compounds containing halogen, sulphur, nitroso and nitro groups, of azo and azoxy compounds, of hydrazines, Schiff's bases, imines and amines, of carbon-oxygen compounds, such as, for example, alcohols, ethers, ethylene oxides and organic peroxides and ozonides, of carbon-carbon compounds and of nitrogen-nitrogen compounds.

The metal catalysts prepared according to the invention are preferably used for the hydrogenation of nitroso and nitro compounds of aromatic hydrocarbons and of nitriles.

The use of the depyrophorised metal catalysts prepared by the process according to the invention is explained with the aid of the hydrogenation of a 2,4/2,6-dinitroltoluene mixture as follows.

The hydrogenation is carried out in a continuous sump phase hydrogenation apparatus, which consists of four reactors of customary construction connected in series, with the aid of which a hydrogen cycle is produced.

A catalyst depyrophorised by the process according to the invention, for example Raney nickel/iron, is suspended, in the hydrogenation apparatus, in an isopropanol/water mixture, for example with the composition 85% by weight of isopropanol and 15% by weight of water, as the solvent and, after adding a mixture of 65% by weight of 2,4-dinitrotoluene and 35% by weight of 2,6-dinitrotoluene, the treatment is then carried out at elevated pressure, for example 80–150 bars of nitrogen pressure, and at temperatures of 100°–200° C. The maximum throughput is about 5–6 tonnes of dinitrotoluene per hour. The consumption of catalyst is about 0.01–0.04% by weight of catalyst per kg of dinitrotoluene mixture.

The results achieved in the hydrogenation of a 2,4/2,6-dinitrotoluene mixture (65/35) are also to be observed for 2,4/2,6-dinitrotoluene (80/20) and for pure 2,4-dinitrotoluene.

EXAMPLES

Part A: Pyrophoric Catalysts Employed

Preparation of Raney catalysts from the corresponding aluminium alloys

The finely powdered Al alloy is added to initially introduced 20-25% strength cold sodium hydroxide solution in portions, whilst stirring and under an inert gas, whereupon the ratio of g atoms of Al to mols of NaOH should be between 1:3 to 1:4. The aluminium contained in the alloy dissolves as sodium aluminate, with vigorous evolution of hydrogen. During the dissolving process, in which, in general, at least 95% of the aluminium is dissolved out, the reaction temperature should not exceed 80° C. When the entire alloy has been added, the mixture is subsequently allowed to react at 80° C. for a further 1 to 2 hours and the crude catalyst is decanted off from the aluminate liquor. In order to remove adhering aluminate liquor, the crude catalyst is treated for a further 1 hour with 6-7 liters of 20% strength NaOH/kg of crude catalyst at 80° C. and the black metal sludge obtained after decanting is washed with water until the pH value of the wash water is pH 8.

The Raney catalysts employed for the depyrophorisation by the process according to the invention, according to the illustrative embodiments which follow, can be prepared by the above instructions. Wherever used herein, the term "g atoms" refers, of course, to "gram atoms".

The composition of the individual Raney catalysts is shown in the following table.

| Alloy | Composition of the Ra catalysts used | | |
|---|---|---|---|
| | Ra catalysts | | |
| Al/Ni | 70.00% by weight of Al | Ra Ni | 95.00% by weight of Ni[1] |
| | 30.00% by weight of Ni | | 5.00% by weight of Al |
| Al/Ni/Fe | 60.00% by weight of Al | Ra Ni-Fe | 82.00% by weight of Ni[1] |
| | 34.00% by weight of Ni | | 15.00% by weight of Fe |
| | 6.00% by weight of Fe | | 3.00% by weight of Al |
| Al/Ag | 50.00% by weight of Al | Ra Ag | 95.00% by weight of Ag |
| | 50.00% by weight of Ag | | 5.00% by weight of Al |
| Al/Cu | 70.00% by weight of Al | Ra Cu | 95.00% by weight of Cu |

-continued

Composition of the Ra catalysts used

| Alloy | | Ra catalysts | |
|---|---|---|---|
| Al/Co | 30.00% by weight of Cu | Ra Co | 5.00% by weight of Al |
|  | 70.00% by weight of Al |  | 95.00% by weight of Co[1] |
|  | 30.00% by weight of Co |  | 5.00% by weight of Al |
| Al/Co/Fe | 60.00% by weight of Al | Ra Co-Fe | 82.00% by weight of Co |
|  | 34.00% by weight of Co |  | 15.00% by weight of Fe |
|  | 6.00% by weight of Fe |  | 3.00% by weight of Al |
| Al/Co/Ni/Fe | 70.00% by weight of Al | Ra Co-Ni-Fe | 91.50% by weight of Co |
|  | 28.30% by weight of Co |  | 3.65% by weight of Ni |
|  | 1.13% by weight of Ni |  | 1.84% by weight of Fe |
|  | 0.57% by weight of Fe |  | 3.00% by weight of Al |
| Al/Ni/Cu | 70.00% by weight of Al | Ra Ni-Cu | 87.30% by weight of Ni |
|  | 27.00% by weight of Ni |  | 9.70% by weight of Cu |
|  | 3.00% by weight of Cu |  | 3.00% by weight of Al |
| Al/Cu/Zn | 50.00% by weight of Al | Ra Cu-Zn | 64.00% by weight of Cu |
|  | 33.00% by weight of Cu |  | 33.00% by weight of Zn |
|  | 17.00% by weight of Zn |  | 3.00% by weight of Al |
| Al/Ni/Fe/Cr | 60.00% by weight of Al | Ra Ni-Fe-Cr | 87.30% by weight of Ni |
|  | 36.00% by weight of Ni |  | 4.85% by weight of Fe |
|  | 2.00% by weight of Fe |  | 4.85% by weight of Cr |
|  | 2.00% by weight of Cr |  | 3.00% by weight of Al |

[1]The residual aluminium constituents were not taken into account when calculating the experimental mixtures.

| Alloy | | Ra catalysts | |
|---|---|---|---|
| Al/Ni/Fe/Ag | 59.00% by weight of Al | Ra Ni-Fe-Ag | 75.70% by weight of Ni |
|  | 32.00% by weight of Ni |  | 18.90% by weight of Fe |
|  | 8.00% by weight of Fe |  | 2.40% by weight of Ag |
|  | 1.00% by weight of Ag |  | 3.00% by weight of Al |
| Al/Ni/Fe/Cu | 59.00% by weight of Al | Ra Ni-Fe-Cu | 75.70% by weight of Ni |
|  | 32.00% by weight of Ni |  | 18.90% by weight of Fe |
|  | 8.00% by weight of Fe |  | 2.40% by weight of Cu |
|  | 1.00% by weight of Cu |  | 3.00% by weight of Al |
| Al/Ni/Fe/Ti | 59.00% by weight of Al | Ra Ni-Fe-Ti | 75.70% by weight of Ni |
|  | 32.00% by weight of Ni |  | 18.90% by weight of Fe |
|  | 8.00% by weight of Fe |  | 2.40% by weight of Ti |
|  | 1.00% by weight of Ti |  | 3.00% by weight of Al |
| Al/Ni/Fe/V | 59.00% by weight of Al | Ra Ni-Fe/V | 75.70% by weight of Ni |
|  | 32.00% by weight of Ni |  | 18.90% by weight of Fe |
|  | 8.00% by weight of Fe |  | 2.40% by weight of V |
|  | 1.00% by weight of V |  | 3.00% by weight of Al |
| Al/Ni/Fe/Mo | 59.00% by weight of Al | Ra Ni-Fe-Mo | 75.70% by weight of Ni |
|  | 32.00% by weight of Ni |  | 18.90% by weight of Fe |
|  | 8.00% by weight of Fe |  | 2.40% by weight of Mo |
|  | 1.00% by weight of Mo |  | 3.00% by weight of Al |
| Al/Ni/Fe/Pb | 59.00% by weight of Al | Ra Ni-Fe-Pb | 75.70% by weight of Ni |
|  | 32.00% by weight of Ni |  | 18.90% by weight of Fe |
|  | 8.00% by weight of Fe |  | 2.40% by weight of Pb |
|  | 1.00% by weight of Pb |  | 3.00% by weight of Al |
|  |  | Ra Ni-Pt[1] | 92.00% by weight of Ni |
|  |  |  | 5.00% by weight of Pt |
|  |  |  | 3.00% by weight of Al |
|  |  | Ra Ni-Pd[1] | 92.00% by weight of Ni |
|  |  |  | 5.00% by weight of Pd |
|  |  |  | 3.00% by weight of Al |
|  |  | Ra Ni/Au[1] | 92.00% by weight of Ni |
|  |  |  | 5.00% by weight of Au |
|  |  |  | 3.00% by weight of Al |

[1]These Raney catalysts were prepared by subsequent treatment of Raney nickel with the corresponding noble metal salts.

Part B: Depyrophorised Catalysts, Illustrative Embodiments

Example 1

Depyrophorisation

Before the start of the experiment, all the air in a stirred glass apparatus, which is provided with a dropping funnel which can be heated, a gas inlet tube for inert gas and a vertical tube, is expelled by means of an inert gas. If a reaction is carried out at the boiling point of the reaction medium, the reaction apparatus must additionally be fitted with a reflux condenser. The pyrophoric Raney catalyst is now initially introduced as a suspension in a solvent, for example about 100 g of Raney nickel as an aqueous suspension corresponding to 50 g of 100% Raney nickel*), under an inert gas. In general, in the Raney catalyst/solvent suspension initially introduced, this solvent is then replaced by that solvent for the nitro compound, for example water by isopropanol. A solution containing the required amount of nitro compound, for example 773.5 g of dinitrotoluene 2,4/2,6-isomer mixture of the composition 80% by weight to 20% by weight (DNT 80/20) as a 10% strength by weight solution in isopropanol, corresponding to the ratio of g atoms of active metal to mols of nitro compound given above, is added dropwise to the Raney nickel/isopropanol suspension thus obtained, whilst stirring, starting at room temperature. In the present example, the ratio of g atoms of Ni to mols of DNT 80/20 is 1:5.

*)The amounts of Raney catalysts given in all the following examples relate to 100% of the Raney contact catalyst concerned.

In order to prevent, if appropriate, the dissolved nitro compound from crystallising out, the solution of the nitro compound, for example in the form of the isopropanol solution, must be employed after warming to 40° C. This solution is added at such a rate that the reaction temperature of, for example, 50° C., is not exceeded. Since the reaction is weakly exothermic, external cooling with water is sufficient to maintain this reaction temperature. In order to bring the reaction to completion, the mixture is further stirred at this temperature until the total reaction time is 30 minutes. The Raney catalyst treated in this way is separated off from the mother liquor at 45°–50° C. on a heatable frit, washed with 50 ml of isopropanol, dried in a stream of inert gas and then discharged as a non-pyrophoric, dry powder. In general, the yield is 95–98%. In the present example, 49 g of non-pyrophoric Raney nickel, corresponding to 98% of theory, are obtained. The activity of the non-pyrophoric catalyst thus obtained is determined by the hydrogenation of DNT 80/20 under standard conditions.

Testing

80±0.1 g of solid dinitrotoluene (80/20) as well as 240±1 g of isopropanol and 10 g of the Raney catalyst to be tested are successively weighed out and filled into a 0.7 l V4A stirred autoclave.

The autoclave is flushed with $H_2$ and subjected to a pressure test at 100 bars of $H_2$ before the hydrogenation is started. During the reaction, the reaction temperature is registered with a temperature recorder. The reaction temperature reached after starting up is recorded. At the start of the hydrogenation, the stirrer is switched on, it being necessary to ensure that the stirring speed is always constant in all experiments. The reaction mixture becomes saturated with $H_2$, the initial pressure of 100 bars falling a few bars to a constant value. The pressure is increased again to 100 bars and the mixture is stirred for 1–2 minutes. The mixture must be heated up, if appropriate by additional heating, until the start temperature is achieved. The amount of hydrogen consumed in the course of the hydrogenation is carefully replaced again, the heat liberated during the reaction determining the rate of the reaction, since the maximum hydrogenation temperature should be 100°±3° C. For this reason it is advisable to allow the initial pressure to fall from 100 bars to 10 bars and subsequently to carry out the reaction in the pressure range from 10–30 bars until no further absorption of $H_2$ can be detected and the reaction temperature slowly falls. The reaction has thus ended. This can also be recognised by the fact that an increase in pressure to 100 bars of $H_2$ causes no jump in temperature and no further decrease in pressure. The reaction mixture is allowed to react for a further 10 minutes under this pressure and at the temperature reached at the end of the reaction, whilst heating externally. If the hydrogenation described above has ended, the resulting reaction mixture is separated off from the catalyst by decanting and the latter is appropriately reemployed for further hydrogenation reactions. The constituents of the reaction mixture are subsequently analysed. If the hydrogenation reactions are carried out at higher pressures, so much heat of reaction is liberated that the maximum hydrogenation temperature given above of 100°±3° C. cannot be maintained. In order to make a more precise statement regarding the life, series of experiments must be carried out with repeated use of the catalyst to be investigated.

Examples 2–6

The depyrophorisation of Ra Ni 30/70 was carried out according to Example 1 with DNT 80/20 as a 10% strength by weight solution in isopropanol, but changing the ratios of g atoms of Ni to mols of DNT.

| Example | g of Ra | Ni g of DNT 80/20 | Ratio of g atoms of Ni to mols of DNT | Yield |
|---|---|---|---|---|
| 2 | 41.36 | 128.1 | 1:1 | 40 g = 96.7% of theory |
| 3 | 47.8 | 111 | 1:0.75 | 46 g = 96.2% of theory |
| 4 | 40.58 | 62.8 | 1:0.5 | 40 g = 98.5% of theory |
| 5 | 48.65 | 37.7 | 1:0.25 | 48 g = 98.6% of theory |
| 6 | 32.0 | 12.4 | 1:0.125 | 31.5 g = 98.4% of theory |

The catalysts obtained gave the following values in the activity test according to Example 1:

| Example | Use in hydrogenation | Start temperature [°C.] | Running time [minutes] | $H_2$ consumption [bars] |
|---|---|---|---|---|
| 2 | 1st | 55 | 33 | 225 |
|   | 2nd–6th | 25–27 | 29–33 | 225 |
| 3 | 1st | 41 | 29 | 225 |
|   | 2nd–6th | 25–27 | 27–34 | 225 |
| 4 | 1st | 58 | 31 | 230 |
|   | 2nd–6th | 25–28 | 22–31 | 210–225 |
| 5 | 1st | 52 | 31 | 225 |
|   | 2nd–15th | 25–27 | 29–33 | 220–225 |
|   | 16th–30th | 28 | 33 | 220 |
| 6 | 1st | 36 | 33 | 220 |

EXAMPLE 7

Example 1 was repeated, but 27.70 g of 100% Ra Ni were employed with 1.159 g of nitrobenzene without a solvent, which corresponded to a ratio of g atoms of active metal (Ni) to mols of nitrobenzene of 1:20.

27.2 g (98.1% of theory) of non-pyrophoric catalyst were obtained.

Example 8

Example 1 was repeated, but 8.45 g of 100% Ra Ni were employed with 1.770 g of nitrobenzene without a solvent, which corresponded to a ratio of g atoms of active metal (Ni) to mols of nitrobenzene of 1:100.

8.3 g (89.2% of theory) of non-pyrophoric catalyst were obtained.

The resulting catalyst gave the following values in the activity test according to Example 1:

| 1st use | 88° C. start temperature | 230 bars $H_2$ consumption | 9 minutes hydrogenation time |
|---|---|---|---|
| 2nd–3rd use | 77–88° C. start temperature | 230 bars $H_2$ consumption | 8–9 minutes hydrogenation time |

Examples 9–12

The depyrophorisation of Ra Ni 30/70 was carried out according to Example 4 with DNT 80/20 as a 10% strength by weight solution in isopropanol, but changing the reaction time.

| Example | g of Ra | Ni g of DNT 80/20 | Reaction time [hours] | Yield |
|---|---|---|---|---|
| 9 | 37.47 | 58 | 0.5 | 37.1 g = 99% of theory |
| 10 | 38.33 | 59.3 | 1 | 38 g = 99% of theory |
| 11 | 29.47 | 45.5 | 2 | 29 g = 98.4% of theory |
| 12 | 42.62 | 65.9 | 4 | 42.2 g = 99% of theory |

Examples 13–17

The depyrophorisation of Ra Ni 30/70 was carried out according to Example 1, but using an isomer mixture of 2,4/2,6-dinitrotoluene[1]) and 2,4/2,6-diaminotoluene[2]) in the form of a 30% strength by weight solution in isopropanol, and changing the ratios of g atoms of Ni to mols of DNT.

[1])The isomers are in the weight ratio 80:20
[2])The isomer mixture of the diaminotoluenes is prepared by hydrogenating the dinitrotoluene mentioned above.

| Example | g of Ra | Ni g of isomer mixture | Ratio of g atoms of Ni to mols of DNT | Yield |
|---|---|---|---|---|
| 13 | 46.49 | 431 | 1:1 | 46.1 g = 99% of theory |
| 14 | 39.24 | 240.5 | 1:0.666 | 38.9 g = 99.1% of theory |
| 15 | 52.73 | 242.6 | 1:0.5 | 52.5 g = 98.9% of theory |
| 16 | 22.82 | 52 | 1:0.25 | 22.3 g = 97.7% of theory |
| 17 | 30.62 | 34.5 | 1:0.125 | 30.3 g = 98.9% of theory |

The resulting catalysts gave the following values in the activity test according to Example 1:

| Example | Use in hydrogenation | Start temperature [°C.] | Running time [minutes] | $H_2$ consumption [bars] |
|---|---|---|---|---|
| 14 | 1st | 42 | 29 | 220 |
|  | 2nd–7th | 25–28 | 26–28 | 220—225 |
| 15 | 1st | 46 | 29 | 225 |
|  | 2nd–4th | 24–26 | 27–31 | 225 |
| 16 | 1st | 68 | 38 | 230 |
|  | 2nd–4th | 26–27 | 34–35 | 220–230 |

Example 18

Example 13 was repeated but 32.44 g of 100% Ra Ni-Fe were employed with 122.6 g of an isomer mixture of DNT/TDA, which corresponded to a ratio of g atoms of active metal (Ni+Fe) to mols of dinitrotoluene of 1:0.66.

32 g (98.6% of theory) of non-pyrophoric catalyst were obtained.

The resulting catalyst gave the following values in the activity test according to Example 1:

| 1st use | 103° C. start temperature | 235 bars $H_2$ consumption | 67 minutes hydrogenation time |
|---|---|---|---|
| 2nd–4th use | 24–30° C. start temperature | 220 bars $H_2$ consumption | 29–36 minutes hydrogenation time |
| 5th–7th use | 41–50° C. start temperature | 220 bars $H_2$ consumption | 35–38 minutes hydrogenation time |

Examples 19 to 23

The depyrophorisation of Ra Ni-Fe was carried out according to Example 1 with DNT 80/20 as a 10% strength by weight solution in isopropanol, but changing the ratios of g atoms of Ni-Fe to mols of DNT.

| Example | g of Ra Ni-fe | g of DNT | Ratio of g atoms of (Ni + Fe) to mols of DNT | Yield |
|---|---|---|---|---|
| 19 | 20.53 | 63.3 | 1:1 | 20.2 g = 98.4% of theory |
| 20 | 37.8 | 87.5 | 1:0.75 | 37.1 g = 98.2% of theory |
| 21 | 41.97 | 64.3 | 1:0.5 | 41.7 g = 99.3% of theory |
| 22 | 39.54 | 30.3 | 1:0.25 | 39.2 g = 99.1% of theory |
| 23 | 38.48 | 14.5 | 1:0.125 | 38.2 g = 99.3% of theory |

The resulting catalysts gave the following values in the activity test according to Example 1:

| Example | Use in hydrogenation | Start temperature [°C.] | Running time [minutes] | $H_2$ consumption [bars] |
|---|---|---|---|---|
| 19 | 1st | 39 | 30 | 235 |
|  | 2nd–6th | 25–27 | 36–40 | 215–220 |
| 20 | 1st | 28 | 25 | 235 |
|  | 2nd–6th | 26–40 | 29–31 | 210–230 |
| 21 | 1st | 38 | 22 | 230 |
|  | 2nd–6th | 24–26 | 23–29 | 220–230 |
| 22 | 1st | 60 | 34 | 235 |
|  | 2nd–7th | 24–26 | 28–35 | 215–225 |
| 23 | 1st | 68 | 38 | 225 |
|  | 2nd–4th | 22–24 | 31–36 | 210 |
|  | 5th–6th | 52 | 29–30 | 205 |

Examples 24 to 26

The depyrophorisation of Ra Ni 30/70 was carried out according to Example 1, but using DNT 65/35 in the form of solutions of various concentrations in isopropanol and changing the ratios of g atoms of Ni to mols of DNT.

| Example | g of Ra Ni | g of DNT | Solution in isopropanol | Ratio of g atoms of Ni to mols of DNT | Yield (g = % of theory) |
|---|---|---|---|---|---|
| 24 | 50 | 154.8 | 10% by weight | 1:1 | 49.5 g = 99.0 |
| 25 | 41.87 | 64.7 | 20% by weight | 1:0.5 | 41.5 g = 99.1 |
| 26 | 35.36 | 54.8 | 30% by weight | 1:0.5 | 35 g = 98.9 |

The resulting catalysts gave the following values in the activity test according to Example 1:

| Example | Use in hydrogenation | Start temperature [°C.] | Running time [minutes] | $H_2$ consumption [bars] |
|---|---|---|---|---|
| 24 | 1st | 60 | 18 | 230 |

-continued

| Example | Use in hydrogenation | Start temperature [°C.] | Running time [minutes] | H₂ consumption [bars] |
|---|---|---|---|---|
|  | 2nd–4th | 24–30 | 17–19 | 235 |
| 25 | 1st | 62 | 18 | 225 |
|  | 2nd–3rd | 46–48 | 16–18 | 220 |
| 26 | 1st | 62 | 14 | 235 |
|  | 2nd–3rd | 52–56 | 10–12 | 220 |

Example 27

Example 24 was repeated but 50 g of 100% Ra Ni-Fe were employed with 154.8 g of dinitrotoluene 65/35 as a 10% strength by weight solution in isopropanol, which corresponded to a ratio of g atoms of active metal (Ni+Fe) to mols of dinitrotoluene of 1:1.

49.5 g (99% of theory) of non-pyrophoric catalysts were obtained.

The resulting catalyst gave the following values in the activity test according to Example 1:

| 1st use | 61° C. start temperature | 235 bars H₂ consumption | 18 minutes hydrogenation time |
|---|---|---|---|
| 2nd–4th use | 28–30° C. start temperature | 235 bars H₂ consumption | 17–20 minutes hydrogenation time |

Example 28

Example 1 was repeated, but 20.16 g of 100% Ra Ni were employed with 105.1 g of 2-nitroanisole as a 30% strength by weight solution in amyl alcohol, which corresponded to a ratio of g atoms of active metal (Ni) to mols of 2-nitroanisole of 1:2.

The reaction mixture was heated to 50° C. for 0.5 hour.

20 g (99.2% of theory) of non-pyrophoric catalyst were obtained.

The resulting catalyst gave the following values in the activity test according to Example 1:

| 1st use | 110° C. start temperature | 240 bars H₂ consumption | 8 minutes hydrogenation time |
|---|---|---|---|
| 2nd–3rd use | 70–72° C. start temperature | 240 bars H₂ consumption | 7–8 minutes hydrogenation time |

Example 29

Example 1 was repeated, but 9.18 g of 100% Ra Ni were employed with 233 g of the trisodium salt of 1-nitronaphthalene-3,6,8-trisulphonic acid as an 18% strength by weight solution in water, which corresponded to a ratio of g atoms of active metal (Ni) to mols of nitro compound of 1:3.

The reaction mixture was heated to 50° C. for 0.5 hour.

9.0 g (98.0% of theory) of non-pyrophoric catalyst were obtained.

Example 30

Example 1 was repeated, but 19.61 g of 100% Ra Ni were employed with 105.2 g of p-nitrochlorobenzene as a 10% strength by weight solution in isopropanol, which corresponded to a ratio of g atoms of active metal (Ni) to mols of p-nitrochlorobenzene of 1:2.

The reaction mixture was heated to the boiling point for 0.5 hour.

19.4 g (98.9% of theory) of non-pyrophoric catalyst were obtained.

Example 31

Example 1 was repeated, but 10.63 g of 100% Ra Ni were employed with 77.8 g of 2-nitro-diphenyl ether (98.2% pure) as a 10% strength by weight solution in isopropanol, which corresponded to a ratio of g atoms of active metal (Ni) to mols of 2-nitro-diphenyl ether of 1:2.

The reaction mixture was heated to the boiling point for 0.5 hour.

10.4 g (97.8% of theory) of non-pyrophoric catalyst were obtained.

The resulting catalyst gave the following values in the activity test according to Example 1:

| 1st use | 72° C. start temperature | 300 bars H₂ consumption | 30 minutes hydrogenation time |
|---|---|---|---|
| 2nd–3rd use | 90–104° C. start temperature | 295 bars H₂ consumption | 8–9 minutes hydrogenation time |

Example 32

Example 1 was repeated, but 10.8 g of 100% Ra Ni were employed with 55.9 g of 2-nitroanisole as a 10% strength by weight solution in isopropanol, which corresponded to a ratio of g atoms of active metal (Ni) to mols of 2-nitroanisole of 1:2.

The reaction mixture was heated to the boiling point for 0.5 hour.

10.7 g (99.0% of theory) of non-pyrophoric catalyst were obtained.

Example 33

Example 1 was repeated, but 14.55 g of 100% Ra Ni were employed with 85.7 g of 4-chloro-2-nitrophenol as a 30% strength by weight solution in isopropanol, which corresponded to a ratio of g atoms of active metal (Ni) to mols of 4-chloro-2-nitrophenol of 1:2.

The reaction mixture was heated to 50° C. for 0.5 hour.

14.4 g (98.9% of theory) of non-pyrophoric catalyst were obtained.

EXAMPLE 34

Example 1 was repeated, but 16.16 g of 100% Ra Ni were employed with 101.3 g of 2,4-dinitrophenol as a 20% strength by weight solution in isopropanol, which corresponded to a ratio of g atoms of active metal (Ni) to mols of 2,4-dinitrophenol of 1:2.

The reaction mixture was heated to 60° C. for 0.5 hour.

16 g (99.0% of theory) of non-pyrophoric catalyst were obtained.

EXAMPLE 35

Example 1 was repeated, but 14 g of 100% Ra Ni were employed with 65.2 g of 2-nitrotoluene without a solvent, which corresponded to a ratio of g atoms of active metal (Ni) to mols of 2-nitrotoluene of 1:2.

The reaction mixture was heated to 100° C. in a stirred autoclave under 1.5 bars for 0.5 hour.

13.8 g (98.5% of theory) of non-pyrophoric catalyst were obtained.

EXAMPLE 36

Example 1 was repeated, but 15.23 g of 100% Ra Ni were employed with 31.6 g of nitromethane without a solvent, which corresponded to a ratio of g atoms of active metal (Ni) to mols of nitromethane of 1:2.

The reaction mixture was heated to 110° C. in a stirred autoclave under 3 bars for 0.5 hour.

15.0 g (98.4% of theory) of non-pyrophoric catalyst were obtained.

The resulting catalyst gave the following values in the activity test according to Example 1:

| 1st use | 124° C. start temperature | 255 bars $H_2$ consumption | 7 minutes hydrogenation time |
|---|---|---|---|
| 2nd–4th use | 86–94° C. start temperature | 235–240 bars $H_2$ consumption | 8–9 minutes hydrogenation time |

EXAMPLE 37

Example 1 was repeated, but 17.40 g of 100% Ra Ni were employed with 89.4 g of 2-nitro-1,4-dimethylbenzene without a solvent, which corresponded to a ratio of g atoms of active metal (Ni) to mols of 2-nitro-1,4-dimethylbenzene of 1:2.

The reaction mixture was heated to 100° C. in a stirred autoclave under 1.5 bars for 0.5 hour.

17.1 g (98.2% of theory) of non-pyrophoric catalyst were obtained.

The resulting catalyst gave the following values in the activity test according to Example 1:

| 1st use | 84° C. start temperature | 255 bars $H_2$ consumption | 8 minutes hydrogenation time |
|---|---|---|---|
| 2nd–3rd use | 70–66° C. start temperature | 240–250 bars $H_2$ consumption | 7 minutes hydrogenation time |

EXAMPLE 38

Example 1 was repeated, but 13.77 g of 100% Ra Ni were employed with 42.0 g of 2-nitropropane as a 50% strength by weight solution in isopropanol, which corresponded to a ratio of g atoms of active metal (Ni) to mols of 2-nitropropane of 1:2.

The reaction mixture was heated to 150° C. in a stirred autoclave under 1.5 bars for 0.5 hour.

13.4 g (97.3% of theory) of non-pyrophoric catalyst were obtained.

EXAMPLE 39

Example 1 was repeated, but 24.69 g of 100% Ra Ni were employed with 161.3 g of 2,3-dichloronitrobenzene as a 30% strength by weight solution in isopropanol, which corresponded to a ratio of g atoms of active metal (Ni) to mols of 2,3-dichloronitrobenzene of 1:2.

The reaction mixture was heated to the boiling point for 0.5 hour.

24.4 g (98.8% of theory) of non-pyrophoric catalyst were obtained.

The resulting catalyst gave the following values in the activity test according to Example 1:

| 1st use | 82° C. start temperature | 250 bars $H_2$ consumption | 8 minutes hydrogenation time |
|---|---|---|---|
| 2nd–3rd use | 70–54° C. start temperature | 250–240 bars $H_2$ consumption | 7 minutes hydrogenation time |

EXAMPLE 40

Example 1 was repeated, but 8.36 g of 100% Ra Ni were employed with 65 g of 50% strength picric acid in $H_2O$ as a 10% strength by weight solution in isopropanol, which corresponded to a ratio of g atoms of active metal (Ni) to mols of picric acid of 1:1.

The reaction mixture was heated to the boiling point for 0.5 hour.

8.3 g (99.2% of theory) of non-pyrophoric catalyst were obtained.

EXAMPLE 41

Example 1 was repeated, but 7.88 g of 100% Ra Ni were employed with 30.5 g of pure picric acid as a 10% strength by weight solution in water, which corresponded to a ratio of g atoms of active metal (Ni) to mols of picric acid of 1:1.

The reaction mixture was heated to 80°–90° C. for 0.5 hour.

7.7 g (97.7% of theory) of non-pyrophoric catalyst were obtained.

The resulting catalyst gave the following values in the activity test according to Example 1:

| 1st use | 48° C. start temperature | 245 bars $H_2$ consumption | 7 minutes hydrogenation time |
|---|---|---|---|
| 2nd use | 42° C. start temperature | 235 bars $H_2$ consumption | 7 minutes hydrogenation time |
| 3rd use | 50° C. start temperature | 235 bars $H_2$ consumption | 7 minutes hydrogenation time |

EXAMPLE 42

Example 1 was repeated, but 14.51 g of 100% Ra Ni were employed with 77.8 g of 2-chloro-1-nitrobenzene as a 30% strength by weight solution in isopropanol, which corresponded to a ratio of g atoms of active metal (Ni) to mols of 2-chloro-1-nitrobenzene of 1:2.

The reaction mixture was heated to the boiling point for 0.5 hour.

14.3 g (98.5% of theory) of non-pyrophoric catalyst were obtained.

The resulting catalyst gave the following values in the activity test according to Example 1:

| 1st use | 76° C. start temperature | 230 bars $H_2$ consumption | 8 minutes hydrogenation time |
|---|---|---|---|
| 2nd–4th use | 66–82° C. start temperature | 230 bars $H_2$ consumption | 8–10 minutes hydrogenation time |

EXAMPLE 43

Example 1 was repeated, but 13.62 g of 100% Ra Ni were employed with 60.7 g of 2-nitro-diphenylsulphone as a 10% strength by weight solution in isopropanol, which corresponded to a ratio of g atoms of active metal (Ni) to mols of 2-nitro-diphenylsulphone of 1:1.

The reaction mixture was heated to the boiling point for 0.5 hour.

13.5 g (99.1% of theory) of non-pyrophoric catalyst were obtained.

EXAMPLE 44

Example 1 was repeated but 20.32 g of 100% Ra Ni were employed with 85.2 g of 4-nitroso-phenol as a 20% strength by weight solution in isopropanol, which corresponded to a ratio of g atoms of active metal (Ni) to mols of 4-nitrosphenol of 1:2.

The reaction mixture was heated to the boiling point for 0.5 hour.

20.2 g (99.4% of theory) of non-pyrophoric catalyst were obtained.

EXAMPLE 45

Example 1 was repeated, but 35 g of 100% Ra Ni were employed with 118.1 g of 3,5-dinitro-2-hydroxytoluene as a 20% strength by weight solution in isopropanol, which corresponded to a ratio of g atoms of active metal (Ni) to mols of 3,5-dinitro-2-2-hydroxytoluene of 1:1.

The reaction mixture was heated to the boiling point for 0.5 hour.

34.9 g (99.7% of theory) of non-pyrophoric catalyst were obtained.

EXAMPLE 46

Example 1 was repeated, but 23.40 g of 100% Ra Ni were employed with 78.80 g of 3,5-dinitro-2-hydroxytoluene as a 10% strength by weight solution in glycol, which corresponded to a ratio of g atoms of active metal (Ni) to mols of 3,5-dinitro-2-hydroxytoluene of 1:1.

The reaction mixture was heated to 90°–100° C. for 0.5 hour.

23.3 g (99.5% of theory) of non-pyrophoric catalyst were obtained.

The resulting catalyst gave the following values in the activity test according to Example 1:

| 1st use | 64° C. start temperature | 230 bars H$_2$ consumption | 8 minutes hydrogenation time |
|---|---|---|---|
| 2nd use | 50° C. start temperature | 230 bars H$_2$ consumption | 7 minutes hydrogenation time |
| 3rd use | 54° C. start temperature | 230 bars H$_2$ consumption | 7 minutes hydrogenation time |

EXAMPLE 47

Example 1 was repeated, but 16.65 g of 100% Ra Ni were employed with 56 g of 3,5-dinitro-2-hydroxytoluene as a 30% strength by weight solution in polyglycol P 400, which corresponded to a ratio of g atoms of active metal (Ni) to mols of 3,5-dinitro-2-hydroxytoluene of 1:1.

The reaction mixture was heated to 90°–100° C. for 0.5 hour.

16.5 g (99.0% of theory) of non-pyrophoric catalyst were obtained.

The resulting catalyst gave the following values in the activity test according to Example 1:

| 1st use | 70° C. start | 235 bars H$_2$ | 8 minutes hydro- |
|---|---|---|---|
| 2nd use | 54° C. start temperature | 235 bars H$_2$ consumption | 8 minutes hydrogenation time |
| 3rd use | 54° C. start temperature | 235 bars H$_2$ consumption | 8 minutes hydrogenation time |

EXAMPLE 48

Example 1 was repeated, but 26.62 g of 100% Ra Ni were employed with 89.8 g of 2,4-dinitroanisole as a 20% strength by weight solution in isopropanol, which corresponded to a ratio of g atoms of active metal (Ni) to mols of 2,4-dinitroanisole of 1:1.

The reaction mixture was heated to the boiling point for 0.5 hour.

26.5 g (99.5% of theory) of non-pyrophoric catalyst were obtained.

EXAMPLE 49

Example 1 was repeated, but 13.76 g of 100% Ra Ni were employed with 35.4 g of 2-nitro-benzaldehyde as a 10% strength by weight solution in isopropanol, which corresponded to a ratio of g atoms of active metal (Ni) to mols of 2-nitrobenzaldehyde of 1:1.

The reaction mixture was heated to the boiling point for 0.5 hour.

13.5 g (98.1% of theory) of non-pyrophoric catalyst were obtained.

The resulting catalyst gave the following values in the activity test according to Example 1:

| 1st use | 94° C. start temperature | 250 bars H$_2$ consumption | 9 minutes hydrogenation time |
|---|---|---|---|
| 2nd–3rd use | 65–70° C. start temperature | 230–240 bars H$_2$ consumption | 8–9 minutes hydrogenation time |

EXAMPLE 50

Example 1 was repeated, but 27.63 g of 100% Ra Ni were employed with 115.7 g of nitrobenzene as a 10% strength by weight solution in isopropanol, which corresponded to a ratio of g atoms of active metal (Ni) to mols of nitrobenzene of 1:2.

The reaction mixture was heated to the boiling point for 0.5 hour.

27.4 g (99.1% of theory) of non-pyrophoric catalyst were obtained.

EXAMPLE 51

Example 1 was repeated, but 24.76 g of 100% Ra Ni were employed with 51.8 g of nitrobenzene as a 30% strength by weight solution in ethylene glycol monotolyl ether, which corresponded to a ratio of g atoms of active metal (Ni) to mols of nitrobenzene of 1:1.

The reaction mixture was heated to 100° C. for 0.5 hour.

24.6 g (99.3% of theory) of non-pyrophoric catalyst were obtained.

The resulting catalyst gave the following values in the activity test according to Example 1:

| 1st use | 60° C. start temperature | 210 bars H$_2$ consumption | 7 minutes hydrogenation time |
|---|---|---|---|
| 2nd use | 54° C. start | 200 bars H$_2$ | 8 minutes hydro- |

-continued

| | temperature | consumption | genation time |
|---|---|---|---|
| 3rd use | 64° C. start temperature | 210 bars $H_2$ consumption | 8 minutes hydrogenation time |

EXAMPLE 52

Example 1 was repeated, but 20 g of 100% Ra Ni were employed with 41.9 of nitrobenzene as a 30% strength by weight solution in pyrocatechol, which corresponded to a ratio of g atoms of active metal (Ni) to mols of nitrobenzene of 1:1.

The reaction mixture was heated to 100° C. for 0.5 hour.

19.7 g (98.5% of theory) of non-pyrophoric catalyst were obtained.

The resulting catalyst gave the following values in the activity test according to Example 1:

| | | | |
|---|---|---|---|
| 1st use | 64° C. start temperature | 260 bars $H_2$ consumption | 9 minutes hydrogenation time |
| 2nd use | 72° C. start temperature | 255 bars $H_2$ consumption | 9 minutes hydrogenation time |
| 3rd use | 76° C. start temperature | 250 bars $H_2$ consumption | 9 minutes hydrogenation time |

EXAMPLE 53

Example 1 was repeated, but 25.41 g of 100% Ra Ni were employed with 53.2 g of nitrobenzene as a 30% strength by weight solution in 3-acetoxy-phenol, which corresponded to a ratio of g atoms of active metal (Ni) to mols of nitrobenzene of 1:1.

The reaction mixture was heated to 100° C. for 0.5 hour.

25.3 g (99.5% of theory) of non-pyrophoric catalyst were obtained.

The resulting catalyst gave the following values in the activity test according to Example 1:

| | | | |
|---|---|---|---|
| 1st use | 54° C. start temperature | 235 bars $H_2$ consumption | 7 minutes hydrogenation time |
| 2nd use | 60° C. start temperature | 240 bars $H_2$ consumption | 8 minutes hydrogenation time |
| 3rd use | 68° C. start temperature | 235 bars $H_2$ consumption | 7 minutes hydrogenation time |

EXAMPLE 54

Example 1 was repeated, but 23.25 g of 100% Ra Ni were employed with 48.7 g of nitrobenzene as a 30% strength by weight solution in triethylene glycol dimethyl ether, which corresponded to a ratio of g atoms of active metal (Ni) to mols of nitrobenzene of 1:1.

The reaction mixture was heated to 100° C. for 0.5 hour.

23.0 g (98.9% of theory) of non-pyrophoric catalyst were obtained.

The resulting catalyst gave the following values in the activity test according to Example 1:

| | | | |
|---|---|---|---|
| 1st use | 66° C. start temperature | 220 bars $H_2$ consumption | 7 minutes hydrogenation time |
| 2nd use | 58° C. start temperature | 230 bars $H_2$ consumption | 7 minutes hydrogenation time |
| 3rd use | 70° C. start temperature | 235 bars $H_2$ consumption | 8 minutes hydrogenation time |

Examples 55 to 70

The depyrophorisation of Ra Ni 30/70 and Ra Ni-Fe was carried out according to Example 1, but using DNT 65/35 in the form of solutions in the different solvents in various concentrations.

| Example | g of Ra Ni | g of DNT 65/35 | Ratio of g atoms of Ni/mols of DNT | Solvent [% by weight] | Concentration of DNT solution | Reaction conditions | Yield |
|---|---|---|---|---|---|---|---|
| 55 | 18.71 | 115.7 | 1:2 | Benzene/water/isopropanol [59%:6%:35%] | 30 | 0.5 hour 50° C. | 18.2 g = 97.2% of theory |
| 56 | 18.61 | 115 | 1:2 | Cyclohexane/water/isopropanol [58%:6%:36%] | 30 | 0.5 hour 50° C. | 18.1 g = 97.2% of theory |
| 57 | 23.13 | 71.5 | 1:1 | Glycerol | 30 | 0.5 hour 90° C. | 23.0 g = 99.4% of theory |
| 58 | 19.49 | 60.2 | 1:1 | 1-Butanol/water [90%:10%] | 30 | 0.5 hour 70° C. | 19.1 g = 97.9% of theory |
| 65 | 32.30 | 100 | 1:1 | Isopropanol/water [80%:20%] | 10 | 0.5 hour 50° C. | 32.0 g = 99.0% of theory |
| 59 | 22.15 | 68.6 | 1:1 | Methanol/water [80%:20%] | 10 | 0.5 hour 60° C. | 22.0 g = 99.3% of theory |
| 60 | 26.46 | 81.9 | 1:1 | Isopropanol/water [60%:40%] | 10 | 0.5 hour boiling point | 26.0 g = 98.2% of theory |
| 61 | 21.38 | 66.2 | 1:1 | Ethanol/water [90%:10%] | 30 | 0.5 hour 60° C. | 21.1 g = 98.7% of theory |
| 64 | 22.68 | 70.2 | 1:1 | Phenol | 30 | 0.5 hour 100° C. | 22.2 g = 97.8% of theory |
| 66 | 57.7 | 178.7 | 1:1 | Isopropanol/water [80%:20%] | 20 | 0.5 hour 50° C. | 57.2 g = 99.1% of theory |
| 67 | 49 | 152 | 1:1 | Isopropanol/water [80%:20%] | 30 | 0.5 hour 55° C. | 48.5 g = 98.9% of theory |
| | g of Ra Ni-Fe | | g atoms of (Ni + Fe)/mols of DNT | | | | |
| 62 | 20 | 61.3 | 1:1 | Benzene | 30 | 0.5 hour 100° C. 2 bars | 19.8 g = 99.0% of theory |
| 63 | 20 | 61.3 | 1:1 | Cyclohexane | 30 | 0.5 hour 100° C. 2 bars | 19.6 g = 98.0% of theory |

Examples 55 to 70-continued

The depyrophorisation of Ra Ni 30/70 and Ra Ni-Fe was carried out according to Example 1, but using DNT 65/35 in the form of solutions in the different solvents in various concentrations.

| Example | g of Ra Ni | g of DNT 65/35 | Ratio of g atoms of Ni/mols of DNT | Solvent [% by weight] | Concentration of DNT solution | Reaction conditions | Yield |
|---|---|---|---|---|---|---|---|
| 68 | 40.89 | 125.4 | 1:1 | Isopropanol/water [80%:20%] | 10 | 0.5 hour 50° C. | 40.6 g = 99.3% of theory |
| 69 | 42.35 | 130 | 1:1 | Isopropanol/water [80%:20%] | 20 | 0.5 hour 50° C. | 42.0 g = 99.1% of theory |
| 70 | 51 | 156.6 | 1:1 | Isopropanol/water [80%:20%] | 30 | 0.5 hour 55° C. | 50.5 g = 99.0% of theory |

The resulting catalysts gave the following values in the activity test according to Example 1:

| Example | Use in hydrogenation | Start temperature [°C.] | Running time [minutes] | H₂ consumption [bars] |
|---|---|---|---|---|
| 55 | 1st | 90 | 12 | 255 |
|  | 2nd–3rd | 90–100 | 10–11 | 240 |
| 57 | 1st | 84 | 13 | 250 |
|  | 2nd–4th | 74–76 | 9–11 | 245 |
| 58 | 1st | 96 | 14 | 250 |
|  | 2nd–4th | 82–96 | 10–12 | 250 |
| 65 | 1st | 76 | 27 | 220 |
|  | 2nd–3rd | 90–92 | 23 | 210 |
| 59 | 1st | 86 | 8 | 240 |
|  | 2nd–3rd | 70 | 7–8 | 240 |
| 60 | 1st | 114 | 9 | 260 |
|  | 2nd | 90 | 8 | 260 |
|  | 3rd | 85 | 8 | 260 |
| 61 | 1st | 64 | 7 | 240 |
|  | 2nd–3rd | 56–62 | 7 | 240 |
| 64 | 1st | 66 | 6 | 210 |
|  | 2nd–3rd | 62–70 | 7–8 | 215 |
| 66 | 1st | 78 | 22 | 210 |
|  | 2nd–3rd | 78–82 | 16–18 | 210 |
| 67 | 1st | 76 | 18 | 230 |
|  | 2nd–3rd | 60–78 | 17–20 | 230 |
|  | 4th–5th | 80–84 | 18 | 230 |
| 62 | 1st | 100 | 8 | 220 |
|  | 2nd–3rd | 72–70 | 8 | 220 |
| 68 | 1st | 80 | 18 | 240 |
|  | 2nd–3rd | 75–80 | 20–21 | 235 |
| 69 | 1st | 72 | 17 | 230 |
|  | 2nd–4th | 66–74 | 15–17 | 230 |
| 70 | 1st | 74 | 17 | 230 |
|  | 2nd–3rd | 66–72 | 15–17 | 225–235 |
|  | 4th–6th | 74–76 | 17–18 | 230 |

EXAMPLES 71 to 75

The depyrophorisation of Ra Ni-Fe was carried out according to Example 1, but using other nitro compounds, which were employed as 30% strength by weight solutions in isopropanol, and heating the reaction mixture to the boiling point for 0.5 hour.

| Example | g of Ra NiFe | g of nitro compound | Ratio of g atoms (Ni + Fe)/ mols of nitro compound | Yield (g = % of theory) |
|---|---|---|---|---|
| 71 | 18.46 | 108 g of 4-chloro-2-nitrophenol | 1:2 | 18.1 g = 98 |
| 72 | 19.63 | 114.7 g of 1-nitronaphthalene | 1:2 | 19.3 g = 98.3 |
| 73 | 25.64 | 130.5 g of 2-nitro-1,4-dimethylbenzene | 1:2 | 25.2 g = 98.3 |
| 74 | 16.1 | 49.8 g of 2,4-dinitrophenol | 1:1 | 15.9 g = 98.7 |

-continued

| Example | g of Ra NiFe | g of nitro compound | Ratio of g atoms (Ni + Fe)/ mols of nitro compound | Yield (g = % of theory) |
|---|---|---|---|---|
| 75 | 17.82 | 73.9 g of nitrobenzene | 1:2 | 17.6 g = 98.8 |

EXAMPLE 76

Example 1 was repeated, but 22.75 g of 100% Ra Co were employed with 95 g of nitrobenzene as a 30% strength by weight solution in isopropanol, which corresponded to a ratio of g atoms of active metal (Co) to mols of nitrobenzene of 1:2.

The reaction mixture was heated to the boiling point for 0.5 hour.

22.6 g (99.3% of theory) of non-pyrophoric catalyst were obtained.

EXAMPLE 77

Example 1 was repeated, but 18.56 g of 100% Ra Co were employed with 57.2 g of dinitrotoluene 65/35 as a 30% strength by weight solution in isopropanol, which corresponded to a ratio of g atoms of active metal (Co) to mols of dinitrotoluene of 1:1.

The reaction mixture was heated to the boiling point for 0.5 hour.

18.4 g (99.1% of theory) of non-pyrophoric catalyst were obtained.

The resulting catalyst gave the following values in the activity test according to Example 1:

| 1st use | 130° C. start temperature | 280 bars H₂ consumption | 32 minutes hydrogenation time |
|---|---|---|---|
| 2nd–3rd use | 124–128° C. start temperature | 275–280 bars H₂ consumption | 30–32 minutes hydrogenation time |

EXAMPLE 78

Example 1 was repeated, but 44.58 g of 100% Ra Ni 40/60[1] were employed with 691 g of dinitrotoluene 65/35 as a 30% strength by weight solution in isopropanol, which corresponded to a ratio of g atoms of active metal (Ni) to mols of dinitrotoluene of 1:5.
[1] Ra Ni 40/60 was prepared from a Ni-Al alloy containing 40% by weight of Ni and 60% by weight of Al.

The reaction mixture was heated to the boiling point for 0.5 hour.

44.4 g (99.5% of theory) of non-pyrophoric catalyst were obtained.

EXAMPLE 79

Example 1 was repeated, but 38.1 g of 100% Ra Ni 50/50[2]) were employed with 236 g of dinitrotoluene 65/35 as a 30% strength by weight solution in isopropanol, which corresponded to a ratio of g atoms of active metal (Ni) to mols of dinitrotoluene of 1:2.

[2]) Ra Ni 50/50 was prepared from a Ni-Al alloy containing 50% by weight of Ni and 50% by weight of Al.

The reaction mixture was heated to the boiling point for 0.5 hour.

37.7 g (98.9% of theory) of non-pyrophoric catalyst were obtained.

EXAMPLE 80

As an example of the use of non-pyrophoric Raney nickel for the hydrogenation of aromatic compounds, 200 g of toluene were reacted with 10 g of Raney nickel, depyrophorised according to Example 1, in a 0.7 l stirred autoclave at a reaction temperature of 230°–240° C. and under a hydrogen pressure of 100 bars. The start temperature was 195° C. After a hydrogenation time of 15 minutes and a hydrogen consumption of 525 bars, the toluene had been quantitatively converted. The resulting methylcyclooctane had a purity of 99.99%.

EXAMPLE 81

As an example for the use of non-pyrophoric Raney nickel for the hydrogenation of aromatic compound, 200 g of benzene and 10 g of Raney nickel, depyrophorised according to Example 1, were reacted in a 0.7 l stirred autoclave at a reaction temperature of 220°–230° C. and under a hydrogen pressure of 100 bars. The start temperature was 182° C. After a hydrogenation time of 15 minutes and a hydrogen consumption of 600 bars, the benzene had been quantitatively converted. The resulting cyclooctane had a purity of 99.99%.

EXAMPLE 82

As an example for the use of non-pyrophoric Raney nickel for the hydrogenation of nitro compounds, 200 g of 2-nitrotoluene, 10 g of Raney nickel, depyrophorised according to Example 1, and 100 g of isopropanol as the solvent were reacted in a 0.7 l stirred autoclave at a maximum reaction temperature of 130°–140° C. and under a hydrogen pressure of 100 bars. The start temperature was 96° C. After a hydrogenation time of 16 minutes and a hydrogen consumption of 350 bars, the nitro-toluene had been quantitatively converted to toluidine.

EXAMPLE 83

Example 82 was repeated, but 200 g of nitrobenzene and 10 g of Ra Ni, depyrophorised according to Example 1, were employed. The reaction conditions were a hydrogen pressure of 100 bars and a maximum reaction temperature of 150°–160° C. The start temperature was 98° C. After a hydrogenation time of 15 minutes and a hydrogen consumption of 300 bars, the nitrobenzene had been quantitatively converted to aniline.

EXAMPLE 84

As an example for the use of non-pyrophoric Raney nickel for the hydrogenation of olefines, 200 g of cycloocta-1,5-diene were employed with 10 g of Raney nickel, depyrophorised according to Example 1, in a 0.7 l stirred autoclave at a reaction temperature of 190°–200° C. and under a hydrogen pressure of 100 bars. The start temperature was 142° C. After a hydrogenation time of 12 minutes and a hydrogen consumption of 265 bars, the cyclooctadiene had been quantitatively converted. The resulting cyclooctane had a purity of 98.4%.

EXAMPLE 85

Batches were run according to Example 1 with 2 kg of 100% fresh contact catalyst in a semi-industrial installation consisting of two 50 l kettles which were connected with a filter. In this procedure, one kettle was used as the reaction vessel and the second was used for the preparation of the required nitro solution.

The reaction was carried out as follows: 2 kg of 100% Raney nickel, corresponding to 4 kg of an aqueous suspension, were initially introduced into kettle 1. The water was replaced by isopropanol and the suspension was heated to 55°–60° C. 6.18 kg of DNT 65/35 were dissolved in 14.42 kg of isopropanol at 55°–60° C. in kettle 2. The 30% strength by weight solution prepared in kettle 2 was metered into the catalyst suspension initially introduced into kettle 1 according to the ratio of g atoms of Ni to mols of DNT 65/35 of 1:1. The total reaction time was set at 30 minutes. After the reaction had ended, the catalyst was freed from the adhering mother liquor in the filter, washed with isopropanol and blown dry with $N_2$. 1.96 kg, corresponding to 98% of theory, of non-pyrophoric Raney nickel were obtained.

EXAMPLES 86 to 92

The depyrophorisation of Ra Ni and Ra Ni-Fe in a semi-industrial installation was carried out according to Example 85, but with other concentrations of the solution of DNT 65/35 in isopropanol.

| Example | g of Ra Ni | g of DNT 65/35 | Yield (g = % of theory) |
|---|---|---|---|
| 86 | 2,000 | 6,180 as a 20% strength by weight solution in isopropanol | 1,970 g = 98.5 |
| 87 | 2,000 | 6,180 as a 10% strength by weight solution in isopropanol | 1,980 g = 99.0 |
| 88 | 2,000 | 6,180 as a 30% strength by weight solution in an isopropanol/water (80%:20%) mixture | 1,950 g = 97.5 |
|  | g of Ra Ni-Fe |  |  |
| 89 | 2,000 | 6,124 as a 20% strength by weight solution in isopropanol | 1,950 g = 97.5 |
| 90 | 2,000 | 6,124 as a 10% strength by weight solution in isopropanol | 1,970 g = 98.5 |
| 91 | 2,000 | 6,124 as a 20% strength by weight solution in an isopropanol/water (80%:20%) mixture | 1,960 g = 98.0 |
| 92 | 2,000 | 6,124 as a 10% strength by weight solution in an isopropanol/water (80%:20%) mixture | 1,980 g = 99.0 |

The resulting catalysts gave the following values in the activity test according to Example 1:

| Example | Use in hydrogenation | Start temperature [°C.] | Running time [minutes] | $H_2$ consumption [bars] |
|---|---|---|---|---|
| 86 | 1st | 86 | 36 | 225 |
|  | 2nd–4th | 76 | 33 | 220 |

-continued

| Example | Use in hydrogenation | Start temperature [°C.] | Running time [minutes] | H₂ consumption [bars] |
|---|---|---|---|---|
| 87 | 1st | 66 | 20 | 240 |
|  | 2nd–4th | 31 | 20 | 235 |
| 88 | 1st | 84 | 20 | 235 |
|  | 2nd–6th | 84 | 20 | 220 |
|  | 7th–9th | 94 | 50 | 220 |
| 89 | 1st | 68 | 13 | 250 |
|  | 2nd–10th | 56–66 | 12–33 | 235 |
|  | 11th–14th | 80–86 | 36–56 | 235 |
| 91 | 1st | 76 | 13 | 245 |
|  | 2nd–13th | 72–96 | 13–56 | 235 |
| 92 | 1st | 64 | 17 | 245 |
|  | 2nd–10th | 64–92 | 16–56 | 236 |

EXAMPLE 93

Example 85 was repeated, but 2,000 g of 100% Ra Ni-Fe were employed with 6,124 g of dinitrotoluene 65/35 as a 30% strength by weight solution in an isopropanol/water (80%:20%) mixture, which corresponded to a ratio of g atoms of active metal (Ni+Fe) to mols of dinitrotoluene of 1:1.

1,980 g (99% of theory) of non-pyrophoric catalyst were obtained.

The resulting catalyst gave the following values in the activity test according to Example 1:

| 1st use | 70° C. start temperature | 240 bars H₂ consumption | 11 minutes hydrogenation time |
|---|---|---|---|
| 2nd–10th use | 58–76° C. start temperature | 230 bars H₂ consumption | 12–25 minutes hydrogenation time |
| 11th–12th use | 82–90° C. start temperature | 230–235 bars H₂ consumption | 31–52 minutes hydrogenation time |

In order to determine the influence of the storage time on the activity of the catalyst, activity tests were carried out again after 3 and 12 months. However, the maximum hydrogenation temperature of 100° C. indicated in Example 1 was exceeded here.

Activity after 3 months:

| 1st use | 70° C. start temperature | 245 bars H₂ consumption | 16 minutes hydrogenation time |
|---|---|---|---|
| 2nd–13th use | 68–92° C. start temperature | 240 bars H₂ consumption | 13–18 minutes hydrogenation time |
| 14th–35th use | 96–120° C. start temperature | 240 bars H₂ consumption | 13–19 minutes hydrogenation time |

Activity after 1 year:

| 1st use | 84° C. start temperature | 210 bars H₂ consumption | 22 minutes hydrogenation time |
|---|---|---|---|
| 2nd–16th use | 72–98° C. start temperature | 190–200 bars H₂ consumption | 12–17 minutes hydrogenation time |
| 17th–30th use | 106–124° C. start temperature | 185–195 bars H₂ consumption | 12–14 minutes hydrogenation time |

EXAMPLE 94

Example 85 was repeated, but 2,000 g of 100% Ra Ni-Fe were employed with 6,124 g of dinitrotoluene 65/35 as a 30% strength by weight solution in an isopropanol/water (80%:20%) mixture, which corresponded to a ratio of g atoms of active metal (Ni+Fe) to mols of dinitrotoluene of 1:1.

1,980 g (99% of theory) of non-pyrophoric catalyst were obtained.

The resulting catalyst gave the following values in the activity test according to Example 1:

The maximum hydrogenation temperature of 100° C. indicated in Example 1 was also exceeded here.

| 1st use | 60° C. start temperature | 265 bars H₂ consumption | 16 minutes hydrogenation time |
|---|---|---|---|
| 2nd–16th use | 66–88° C. start temperature | 240 bars H₂ consumption | 13–18 minutes hydrogenation time |
| 17th–45th use | 90–124° C. start temperature | 245 bars H₂ consumption | 15–20 minutes hydrogenation time |

The influence of the storage time on the activity of the catalyst was also investigated.

After 3 months' storage time:

| 1st use | 80° C. start temperature | 235 bars H₂ consumption | 17 minutes hydrogenation time |
|---|---|---|---|
| 2nd–10th use | 72–88° C. start temperature | 220 bars H₂ consumption | 13–20 minutes hydrogenation time |
| 11th–30th use | 92–122° C. start temperature | 220 bars H₂ consumption | 16–20 minutes hydrogenation time |

After 6 months' storage time:

| 1st use | 86° C. start temperature | 230 bars H₂ consumption | 17 minutes hydrogenation time |
|---|---|---|---|
| 2nd–10th use | 70–98° C. start temperature | 220 bars H₂ consumption | 15–21 minutes hydrogenation time |
| 11th–30th use | 100–120° C. start temperature | 220 bars H₂ consumption | 13–17 minutes hydrogenation time |

EXAMPLE 95

Example 85 was repeated, but 2,026 g of 100% Ra Ni-Fe were employed with the organic reaction solution obtained analogously to Example 85 and increased to a 3,140 g DNT 65/35 content by adding fresh DNT 65/35, which corresponded to a ratio of g atoms of active metal (Ni+Fe) to mols of DNT of 1:0.5. 2,000 g (98.7% of theory) of non-pyrophoric catalyst were obtained. The resulting catalyst gave the following values with the activity test according to Example 1: however, in order to obtain as high a number of repeated uses as possible of one and the same catalyst, the maximum hydrogenation temperature of 100° C. indicated in Example 1 was exceeded.

| 1st use | 90° C. start temperature | 255 bars H₂ consumption | 15 minutes hydrogenation time |
|---|---|---|---|
| 2nd–6th use | 76–88° C. start temperature | 250 bars H₂ consumption | 15 minutes hydrogenation time |
| 7th–43rd use | 96–122° C. start temperature | 250 bars H₂ consumption | 15–21 minutes hydrogenation |

EXAMPLE 96

Example 85 was repeated, but 2,009 g of 100% Ra Ni-Fe were employed with the organic reaction solution obtained analogously to Example 95 and increased to a DNT 65/35 content of 3,114 g by adding fresh DNT 65/35, which corresponded to a ratio of g atoms of active metal (Ni+Fe) to mols of DNT of 1:0.5. 1,998 g (99.4% of theory) of non-pyrophoric catalyst were obtained. The resulting catalyst gave the following values in the activity test according to Example 1: however, in order to obtain as high a number of repeated uses as possible with one and the same catalyst, the maximum hydrogenation temperature of 100° C. indicated in Example 1 was exceeded.

| 1st use | 78° C. start temperature | 230 bars $H_2$ consumption | 18 minutes hydrogenation time |
|---|---|---|---|
| 2nd–9th use | 68–90° C. start temperature | 240 bars $H_2$ consumption | 18 minutes hydrogenation time |
| 10th–50th use | 104–132° C. start temperature | 260 bars $H_2$ consumption | 20 minutes hydrogenation time |

EXAMPLE 97

Example 1 was repeated, but 24.94 g of 100% Ra Ni-Au were employed with 75.2 g of dinitrotoluene 65/35 as a 30% strength by weight solution in a mixture consisting of isopropanol/water (80:20% by weight), which corresponded to a ratio of g atoms of active metal (Ni+Au) to mols of dinitrotoluene of 1:1.

24.5 g (98.2% of theory) of non-pyrophoric catalyst were obtained.

The resulting catalyst gave the following values in the activity test according to Example 1:

| 1st use | 78° C. start temperature | 230 bars $H_2$ consumption | 9 minutes hydrogenation time |
|---|---|---|---|
| 2nd use | 66° C. start temperature | 230 bars $H_2$ consumption | 8 minutes hydrogenation time |
| 3rd use | 72° C. start temperature | 230 bars $H_2$ consumption | 8 minutes hydrogenation time |

EXAMPLES 98–112

Example 97 was repeated, but the most diverse Raney catalysts were employed:

| Example | g of Raney catalyst | g of DNT 65/35 | Ratio of g atoms of active metals/mols of DNT | Yield |
|---|---|---|---|---|
| 98 | 24.76 g of Ra CoFe | 74.62 | 1:1 | 24.38 g = 98.5% of theory |
| 99 | 24.07 g of Ra NiFeCr | 72.61 | 1:1 | 23.58 g = 98.0% of theory |
| 100 | 23.09 g of Ra NiFeAg | 69.16 | 1:1 | 22.85 g = 99.0% of theory |
| 101 | 25.92 g of Ra NiFeCu | 78.26 | 1:1 | 25.66 g = 99.0% of theory |
| 102 | 20.47 g of Ra NiFeTi | 62.24 | 1:1 | 20.10 g = 98.0% of theory |
| 103 | 25.39 g of Ra NiFeV | 76.98 | 1:1 | 24.88 g = 98.0% of theory |
| 104 | 18.72 g of Ra NiFeMo | 56.10 | 1:1 | 18.34 g = 98.0% of theory |
| 105 | 21.68 g of Ra NiFePb | 64.43 | 1:1 | 21.25 g = 98.0% of theory |
| 106 | 24.78 g of Ra Ag | 39.67 | 1:1 | 24.50 g = 98.0% of theory |
| 107 | 20.43 g of Ra Cu | 55.51 | 1:1 | 19.82 g = 97.0% of theory |
| 108 | 21.23 g of Ra NiCu | 63.15 | 1:1 | 21.00 g = 99.0% of theory |
| 109 | 20.84 g of Ra ZnCu | 57.15 | 1:1 | 20.20 g = 97.0% of theory |
| 110 | 21.3 g of Ra CoNiFe | 66.79 | 1:1 | 20.87 g = 98.0% of theory |
| 111 | 26.67 g of Ra NiPd | 78.10 | 1:1 | 26.40 g = 99.0% of theory |
| 112 | 20.57 g of Ra NiPt | 59.50 | 1:1 | 20.40 g = 99.0% of theory |

The The resulting catalysts gave the following values in the activity test according to Example 1:

| Example | Use in hydrogenation | Start temperature [°C.] | Running time [minutes] | $H_2$ consumption [bars] |
|---|---|---|---|---|
| 98 | 1st | 120 | 33 | 310 |
| | 2nd–3rd | 102–94 | 27–31 | 300 |
| 99 | 1st | 58 | 19 | 295 |
| | 2nd–3rd | 56–68 | 12–11 | 280 |
| 100 | 1st | 58 | 14 | 305 |
| | 2nd–3rd | 74–54 | 12 | 235 |
| 101 | 1st | 66 | 15 | 320 |
| | 2nd–3rd | 74–64 | 11–12 | 295–285 |
| 102 | 1st | 110 | 12 | 265 |
| | 2nd–3rd | 50 | 11 | 250 |
| 103 | 1st | 106 | 14 | 260 |
| | 2nd–3rd | 62 | 9–11 | 240 |
| 104 | 1st | 94 | 11 | 250 |
| | 2nd–3rd | 70–58 | 11 | 250–240 |

-continued

| Example | Use in hydrogenation | Start temperature [°C.] | Running time [minutes] | H₂ consumption [bars] |
|---|---|---|---|---|
| 105 | 1st | 100 | 12 | 250 |
| | 2nd–3rd | 71–74 | 11–13 | 235 |
| 111 | 1st | 60 | 12 | 250 |

EXAMPLE 113

Example 1 was repeated, but 40.4 g of 100% Ra Ni were employed in tablet form with 210 g of 100% pure nitromethane, which corresponded to a ratio of g atoms of active metal (Ni) to mols of nitromethane of 1:5. The reaction mixture was heated to the boiling point for 2.5 hours.

40 g (99% of theory) of non-pyrophoric catalyst were obtained.

The resulting catalyst gave the following values in the activity test according to Example 1:

| 1st use | 126° C. start temperature | 240 bars H₂ consumption | 8 minutes hydrogenation time |
|---|---|---|---|
| 2nd use | 86° C. start temperature | 240 bars H₂ consumption | 8 minutes hydrogenation time |
| 3rd use | 80° C. start temperature | 240 bars H₂ consumption | 12 minutes hydrogenation time |

EXAMPLE 114

Example 1 was repeated, but 31.5 g of 100% Ra Ni were employed with 74.5 g of o-nitrophenol as a 26% strength by weight solution in a 10% strength by weight NaOH solution (corresponding to 21.44 g of 100% NaOH), which corresponded to a ratio of g atoms of active metal (Ni) to mols of o-nitrophenol to mols of NaOH of 1:1:1.

31 g (98.4% of theory) of non-pyrophoric catalyst were obtained.

EXAMPLE 115

As an example for the use of non-pyrophoric Raney nickel for the selective hydrogenation of nitro compounds, 151 g of 2-nitro-5-phenylthio-methoxyacetanilide, dissolved in 800 ml of chlorobenzene, were reacted with 32 g of Raney nickel, depyrophorised according to Example 1, in a 0.7 l stirred autoclave at a reaction temperature of 80°–85° C. and under a hydrogen pressure of 50–30 bars. The working-up of the reaction mixture gave 128 g=88% of theory of 2-amino-5-phenylthio-methoxy-acetanilide.

EXAMPLE 116

5,000 kg of DNT 65/35, corresponding to a isomer mixture of 65% by weight of 2,4-dinitrotoluene and 35% by weight of 2,6-dinitrotoluene, 4,960 kg of an isopropanol/water mixture (85% by weight of isopropanol and 15% by weight of water), 40 kg of a suspension in isopropanol and water of the catalyst prepared according to Example 94 (corresponding to 2 kg of 100% catalyst) and 5,000 kg of recycled catalyst suspension are fed in per hour into a continuous sump phase hydrogenation apparatus, which consists of four reactors connected in series, which are provided with cooling tubes to remove the heat of reaction, a product cooler, two separators and a gas circulation pump, and with the aid of which a circulation of hydrogen is produced, and are treated under a pressure of about 100 bars of H₂ and at at a temperature of 155°–170° C. The recycled catalyst is obtained during the filtration of the reaction mixture after the hydrogenation. It is re-employed as a suspension in the solution of the finished product.

What is claimed is:

1. A process for the hydrogenation of an organic compound which comprises contacting said organic compound with a non-pyrophoric, highly active metal catalyst requiring essentially no pre-activation, and, prepared from a pyrophoric metal catalyst by treating a suspension of the pyrophoric metal catalyst in water and/or an organic solvent with an organic nitro compound or a nitroso compound at elevated temperature and pressure and separating the hydrogenated organic compound from the reaction medium.

2. A process of claim 1 wherein the catalyst is prepared from a pyrophoric metal catalyst by treating a suspension of a pyrophoric metal catalyst, which contains, as the metal, an element of the groups IIa, IIIb, IVa, IVb, Vb, VIb, VIIb, VIII and Ib of the periodic System according to Mendeleev, in water and/or an organic solvent with an organic nitro compound or a nitroso compound.

3. A process of claim 1 wherein the catalyst is prepared from a pyrophoric metal catalyst by treating the suspension of a pyrophoric Raney nickel or Raney nickel/iron catalyst in water and/or an organic solvent with an organic nitro compound or a nitroso compound.

4. A process of claim 1, wherein the organic compound to be hydrogenated is an aromatic nitro or nitroso compound.

5. A process of claim 1, wherein the organic compound to be hydrogenated is a nitrile.

6. A process of claim 1, wherein the organic compound to be hydrogenated is a 2,4/2,6-dinitrotoluene mixture.

* * * * *